(12) United States Patent
Kazama et al.

(10) Patent No.: US 8,337,092 B2
(45) Date of Patent: Dec. 25, 2012

(54) RETAINER-EQUIPPED ROLLER

(75) Inventors: Sadatsune Kazama, Iwata (JP); Izumi Ohashi, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 13/129,203

(22) PCT Filed: Oct. 28, 2009

(86) PCT No.: PCT/JP2009/068507
§ 371 (c)(1),
(2), (4) Date: May 13, 2011

(87) PCT Pub. No.: WO2010/061709
PCT Pub. Date: Jun. 3, 2010

(65) Prior Publication Data
US 2011/0222811 A1    Sep. 15, 2011

(30) Foreign Application Priority Data

Nov. 25, 2008   (JP) .................................. 2008-299654

(51) Int. Cl.
*F16C 33/46* (2006.01)
*F16C 33/34* (2006.01)
*F16C 33/54* (2006.01)

(52) U.S. Cl. ......................... 384/580; 384/565; 384/572

(58) Field of Classification Search .................. 384/428, 384/457, 462, 499, 501–506, 548, 559, 564, 384/569, 570, 572–575, 580, 584–585, 565; 29/898.067
See application file for complete search history.

(56) References Cited

U.S. PATENT DOCUMENTS

| 3,256,052 | A | * | 6/1966 | Howles | 384/580 |
| 3,659,912 | A | * | 5/1972 | Scheifele | 384/575 |
| 4,003,609 | A | * | 1/1977 | Juhas | 384/574 |
| 6,039,475 | A | * | 3/2000 | Furukawa et al. | 384/580 |
| 7,311,447 | B2 | * | 12/2007 | Takeo et al. | 384/457 |
| 2001/0051011 | A1 | * | 12/2001 | Takahashi et al. | 384/572 |
| 2005/0064977 | A1 | * | 3/2005 | Oishi | 475/183 |

FOREIGN PATENT DOCUMENTS

DE   915 760   7/1954
(Continued)

*Primary Examiner* — Marcus Charles
(74) *Attorney, Agent, or Firm* — Clark & Brody

(57) ABSTRACT

A retainer-equipped roller includes a retainer (12) having a pair of ring parts (14) separated in an axis O direction and column parts (15) arranged circumferentially at regular intervals so as to form pockets (22) and connect the pair of ring parts (14), and a plurality of rollers (11) arranged in the pockets. The roller (11) has a chamfered part (13) provided between a roller end face and a roller rolling surface (11*t*). The column part (15) is positioned on a radial outer side of a pitch circle PCD of the roller (11), and a distance between the circumferentially adjacent column parts (15 and 15) is smaller than a diameter of the roller (11). The pair of ring parts (14) has a pair of projection members (16) projecting such that their tip ends are opposed so as to come close to each other, in circumferentially the same position as the column part (15), and in a position on a radially inner side of the pitch circle PCD of the roller (11). The tip ends of the pair of projection members (16) abut on the chamfered parts (13) provided at both ends of the roller (11) and hold the roller between the pair of ring parts (14).

11 Claims, 5 Drawing Sheets

FOREIGN PATENT DOCUMENTS

| | | |
|---|---|---|
| EP | 1 519 062 A2 | 3/2005 |
| EP | 1 860 336 A1 | 11/2007 |
| FR | 1278545 | 12/1961 |
| GB | 2 102 513 A | 2/1983 |
| JP | 45-027131 | 10/1970 |
| JP | 05-69419 | 9/1993 |
| JP | 10-196659 | 7/1998 |
| JP | 2000-074071 | 3/2000 |
| JP | 2007-247818 | 9/2007 |
| WO | 2006/098276 | 9/2006 |

* cited by examiner

RETAINER-EQUIPPED ROLLER

This application is a national stage application based on PCT/JP2009/068507, filed on Oct. 28, 2009.

TECHNICAL FIELD

The present invention relates to a retainer-equipped roller mounted in an annular gap provided between an outer circumference of a rotation shaft and an inner circumference of a support member, to support the rotation shaft.

BACKGROUND ART

Techniques for a retainer-equipped roller having no inner and outer rings is conventionally well known as disclosed in Japanese Unexamined Patent Publication No. 2000-74071 (patent document 1). As for a cage and roller disclosed in the patent document 1, a column part of a retainer is positioned out of a pitch circle of a roller row to increase the number of rollers which are arranged, and thereby increasing load capacity of a retainer-equipped roller.

PATENT DOCUMENT

Patent document 1: Japanese Unexamined Patent Publication No. 2000.74071

DISCLOSURE OF THE INVENTION

However, the above conventional cage and roller has problems as will be described below. That is, since an outside support is positioned on a radial outer side of the pitch circle of the roller row and an inside support is positioned on a radial inner side thereof, between the adjacent rollers, the problem is that lubricant oil is difficult to flow in a space between the outside support and the inside support.

In view of the above circumstances, it is an object of the present invention to provide a retainer-equipped roller having high-load capacity and capable of smoothly supplying lubricant oil into an internal space of a retainer.

A retainer-equipped roller according to the present invention to attain the object includes a retainer having a pair of ring parts separated in an axial direction and column parts arranged circumferentially at regular intervals so as to form pockets and connect the pair of ring parts, and a plurality of rollers arranged in the pockets. The roller has a chamfered part between a roller end face and a roller rolling surface, the column part is positioned on a radial outer side of a pitch circle of the roller, a distance between the circumferentially adjacent column parts is smaller than a diameter of the roller, the pair of ring parts has a pair of projection members projecting such that their tip ends are opposed so as to come close to each other, in circumferentially the same position as the column part, and in a position on a radially inner side of the pitch circle of the roller, and the tip ends of the pair of projection members abut on the chamfered parts provided at both ends of the roller and hold the roller between the pair of ring parts.

According to the present invention, since the tip ends of the pair of projection members abut on the chamfered parts provided at both ends of the roller and hold the roller between the pair of ring parts, many rollers can be arranged in the circumferential direction of the retainer while the roller does not fall off in an inner diameter direction of the retainer. In addition, the column part can prevent the roller from falling off in an outer diameter direction of the retainer. Furthermore, since the pair of projection members project to the chamfered parts of the roller, and the projection member does not reach the rolling surface, lubricant oil can be smoothly supplied from a radial inner side to a space between the circumferentially adjacent rollers.

Here, preferably, the projection member is mounted on a radially outer side of an inner circumferential edge of the ring part. According to this embodiment, the projection member does not project from the ring part to the inner diameter direction, so that a radial thickness of the retainer can be small.

Since the present invention is not limited to the one embodiment, the projection members may be individually arranged in the ring part, but it is preferable that at least two circumferentially adjacent projection members among the projection members arranged circumferentially are connected by a circumferentially extending connection member. According to this embodiment, the plurality of projection members can be mounted in the ring part at the same time, so that assembly efficiency can be improved at the time of production of the retainer-equipped roller according to the present invention.

Preferably, a notch part recessed in the axial direction may be formed in an inner wall of the ring part opposed to the roller end face, and the connection member may be fitted in the notch part. According to this embodiment, the connection member can be firmly fixed to the ring part.

While the present invention is not limited to the one embodiment, the connection member may be in the form of an endless ring and extend along a whole circumference of the ring part. In this case, since the connection member can be mounted from the radial inner side of the ring by being bent, the retainer-equipped roller can be easily assembled. In this case, preferably, the projection member and the connection member are made of a resin. Thus, the projection member can be easily produced by injection molding.

Alternatively, the connection member may be in the form of a C and one end and the other end thereof in a circumferential direction may be opposed with a gap open in the circumferential direction. In this case, since the connection member can be mounted from the radial inner side of the ring part by being reduced in diameter, so that the retainer-equipped roller can be easily assembled. In this case, preferably, the projection member and the connection member are made of a resin. Thus, the projection member can be easily produced by injection molding.

Alternatively, the connection member may be composed of a plurality of arc-shaped segments, and the plurality of arc-shaped segments may be mounted along a whole circumference of the ring part, and forms an endless ring. The connection member may be composed of two, three, four or more members. When the number of the members is two, the member is in the form of a 180-degree arc, and the two 180-degree connection members are combined to form an endless ring body as the connection member and mounted on the ring part. In this case, since the connection member can be mounted from the radial inner side of the ring part, the retainer-equipped roller can be easily assembled. In this case, preferably, the projection member and connection member are made of metal or a resin, preferably, made of metal. When they are made of metal, the projection member can be improved in strength.

Preferably, an inner wall of the connection member mounted in the ring part and opposed to the roller end face is axially recessed from a wall surface of the pocket opposed to the roller end face. Since the pocket of the retainer houses the roller, the ring part inner side edge positioned at an edge of the pocket of the ring part is opposed to the roller end face. Thus, since the inner wall of the connection member mounted in the ring part and opposed to the roller end face is recessed from the ring part inner side edge in the axial direction in this embodiment, the roller can be prevented from abutting on the inner wall of the connection member.

Preferably, the projection member is tapered such that its thickness is large on its root side and small on its tip end side. According to this embodiment, the projection members appropriately abut on the chamfered parts provided at both ends of the roller, and prevent the roller from falling off in the inner diameter direction.

According to the present invention, since the tip ends of the pair of projection members abut on the chamfered parts provided at both ends of the roller and hold the roller between the pair of ring parts, many rollers can be arranged in the circumferential direction of the retainer while the roller is held between the column part and the projection member and does not fall off the retainer. Furthermore, since the pair of projection members projects to the chamfered parts of the roller, and the projection member does not reach the rolling surface, lubricant oil can be smoothly supplied from the radial inner side to the space between the circumferentially adjacent rollers.

DESCRIPTION OF THE EMBODIMENTS

Figure 1:
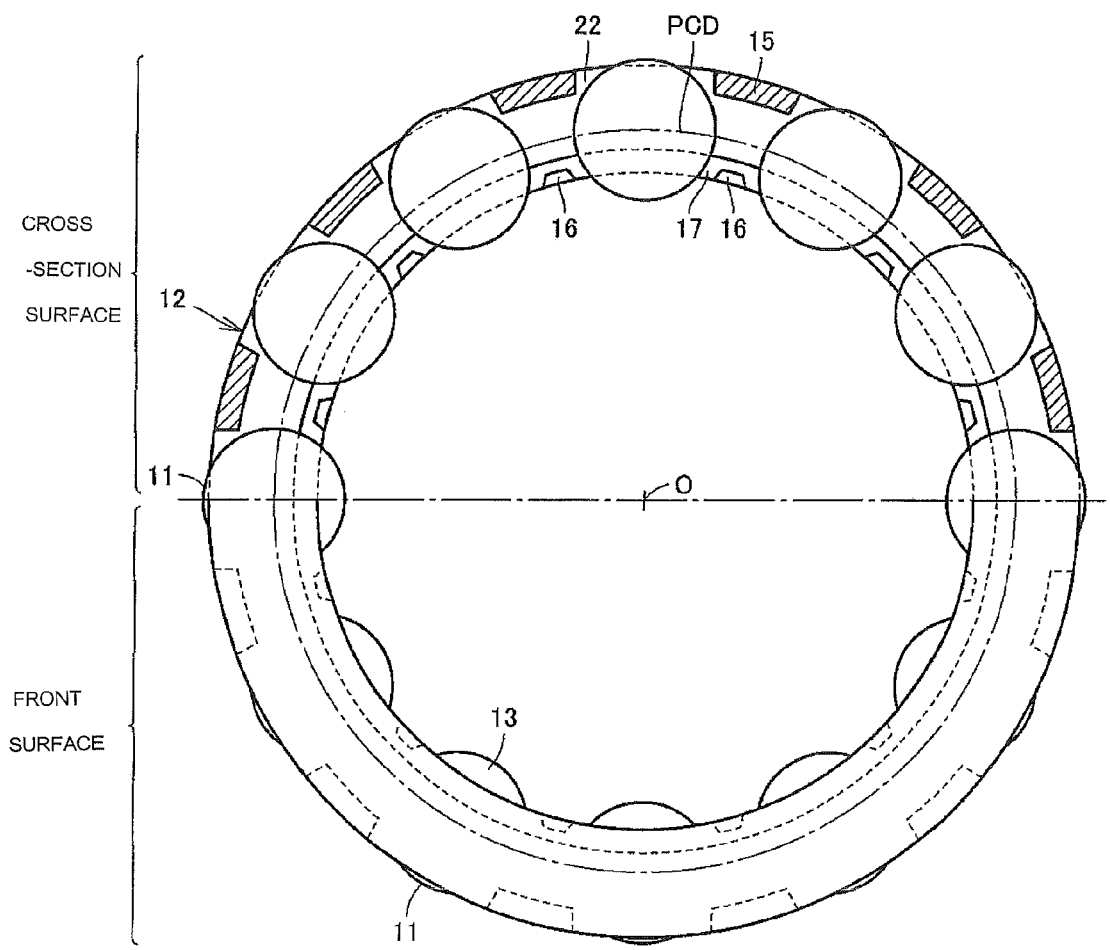
FIG. 1 is a horizontal cross-sectional view and a front view showing a retainer-equipped roller according to a first working example of the present invention.
Figure 2:
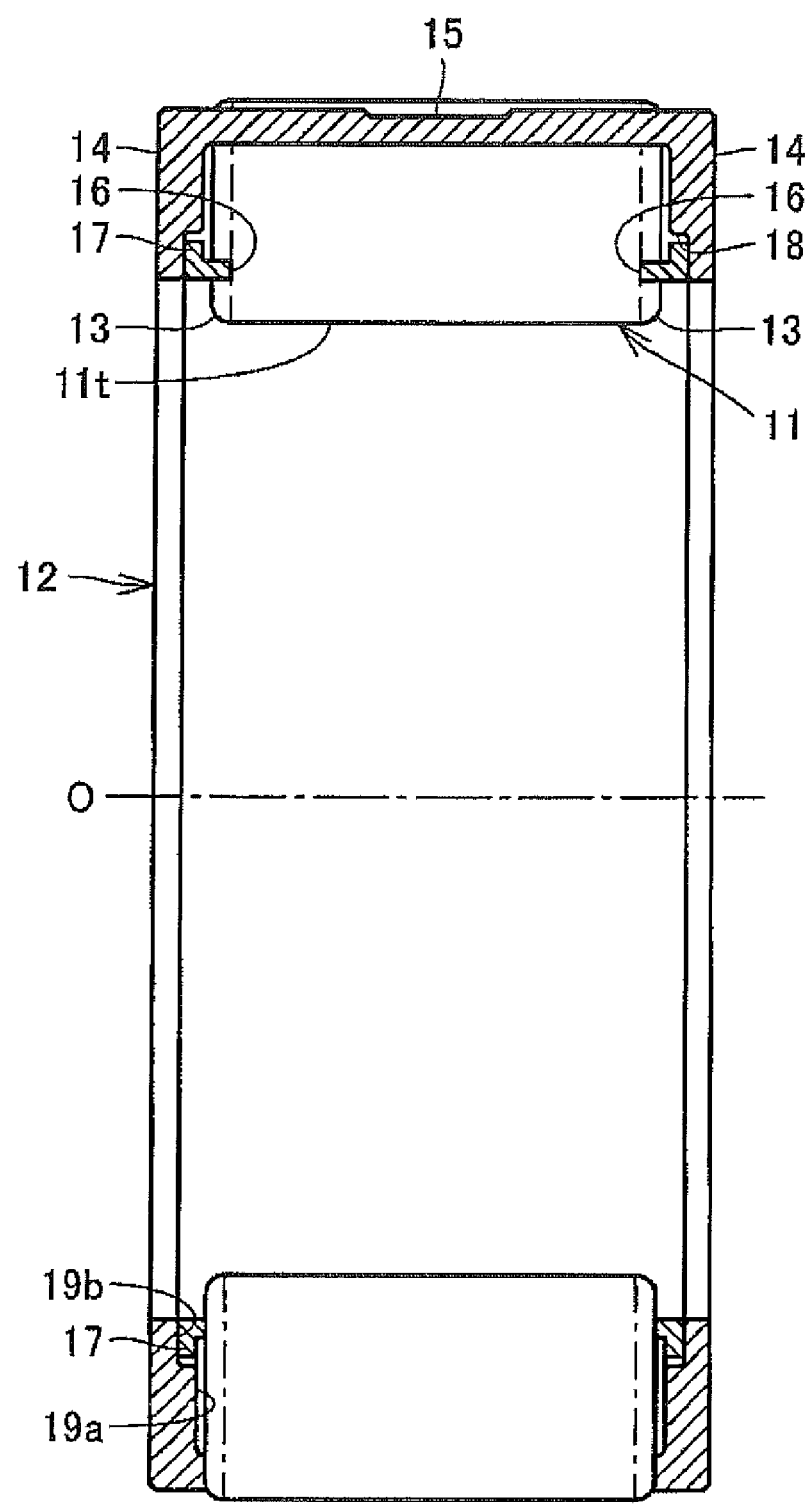
FIG. 2 is a vertical cross-sectional view showing the same working example in which members are partially omitted.

Hereinafter, an embodiment of the present invention will be described in detail based on a working example shown in the drawings. FIG. 1 is a horizontal cross-sectional view and a front view showing a retainer-equipped roller according to this working example. In addition, FIG. 2 is a vertical cross-sectional view of the same working example, in which some members such as the roller are omitted.

The retainer-equipped roller in this working example includes rollers 11 and a retainer 12, and used as a bearing for a general planet gear group. The roller 11 is basically in the form of a cylinder, such as a needle roller. The roller 11 has a chamfered part 13 between a roller end face and a roller rolling surface. The chamfered part 13 may be formed into a ring shape by the well-known method. Alternatively, each end part of the roller 11 may be formed into a spherically expanded shape although it is not shown, and in this case also, the chamfered part is to be provided between a roller end face and a roller rolling surface. In this working example, a boundary between the chamfered part 13 and a rolling surface 11t is shown by one-dot chain line in FIG. 2 so that a position of the chamfered part 13 can be easily recognized.

The retainer 12 has a pair of ring parts 14 and 14 apart from each other in an axial direction, and column parts 15 each extending in the axial direction to connect the ring parts 14 and 14. The column parts 15 are circumferentially arranged at regular intervals to form pockets between the two circumferentially adjacent column parts 15 and 15. The ring part 14 is in the form of a flat and annular disk, and its outer circumferential end is bent at right angles and integrally connected to the column parts 15. The ring part 14 and the column parts 15 are formed by machining or pressing and made of metal. Alternatively, it may be made of a resin by machining or injection molding.

The column parts 15 are circumferentially arranged at regular intervals around a center axis O of the retainer-equipped roller. The roller 11 is arranged between the circumferentially adjacent column parts 15 and 15. The column part 15 is arranged on a radial outer side of a pitch circle PCD of the roller 11, and an interval between the circumferentially adjacent column parts 15 and 15 is smaller than a diameter of the roller 11. Thus, the column part 15 prevents the roller 11 from falling off the retainer 12 in an outer diameter direction.

The pair of ring parts 14 has a pair of projection members 16 projecting from an inner circumferential edge of the ring part so that its tip ends are opposed so as to come close to each other. That is, the projection member 16 projects inward in the axis O direction. A circumferential position of the projection member 16 is the same as a circumferential position of the column part 15. Therefore, the projection member 16 is opposed to the column part 15 in a radial direction, and the roller 11 is arranged between the circumferentially adjacent projection members 16 and 16. In addition, the projection member 16 is mounted in an inner wall of the ring part 14 on a radial inner side of the pitch circle PCD of the roller 11. Here, it is to be noted that a mounting position of the projection member 16 is on the radial outer side of the inner circumferential edge of the ring part 14. In addition, the inner wall means the surface of the ring part 14 facing each other.

FIG. 2 is a cross-sectional view showing a standard state in which an axial center of the roller 11 coincides with an axial center of the retainer 12, and a gap width between one axial end face of the roller 11 and one ring part 14 is equal to a gap width between the other axial end face of the roller 11 and the other ring part 14. In this standard state, the tip ends of the pair of projection members 16 abut on the chamfered parts 13 provided at both ends of the roller 11 to hold the roller 11 between the pair of ring parts. That is, although an axial distance of the tip ends of the pair of projection members 16 is smaller than an axial length of the roller 11, it is not smaller than a dimension between both ends of the roller rolling surface 11t. Each end of the roller rolling surface 11t is represented by the one-dot chain line. Furthermore, a distance between tip ends of the circumferentially adjacent projection members 16 is smaller than the diameter of the roller 11. Thus, the projection member 16 prevents the roller 11 from falling off the retainer 12 in an inner diameter direction. As shown in FIG. 2, a projection length projecting from an inner wall 19a of the ring part 14 is a distance to the chamfered part 13 of the roller 11 and does not extend beyond the rolling surface 11t of the roller 11. Therefore, lubricant oil can be smoothly supplied from the radial inner side of the retainer 12 to a space between the adjacent rollers 11.

Figure 6:
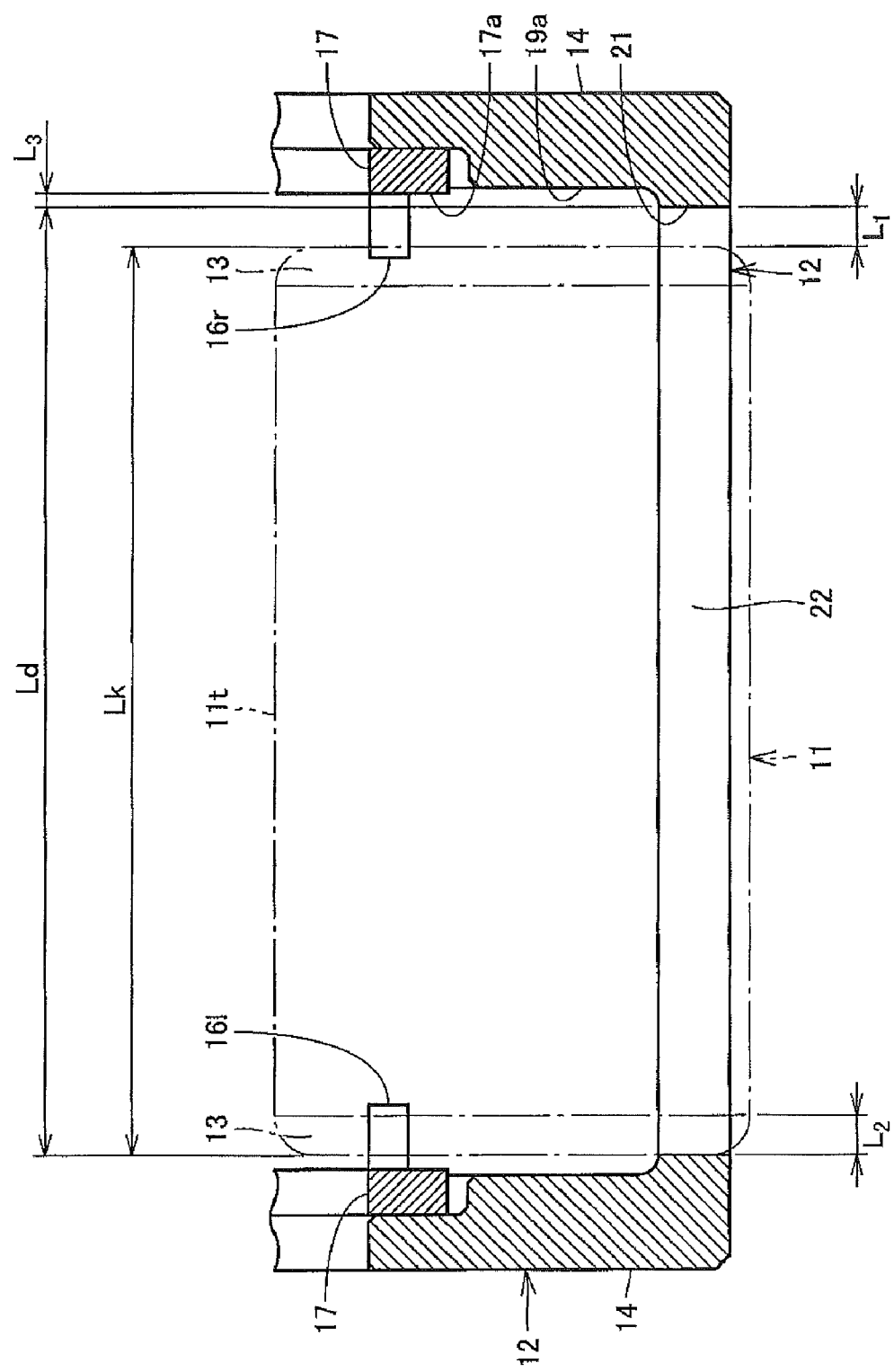
FIG. 6 is an explanatory view showing a dimensional relationship of the members when the roller is temporarily moved to one axial side.

FIG. 6 is a vertical cross-sectional view showing a dimensional relationship between the roller 11 and the retainer 12. The roller has tolerance in an axial length $L_k$, and a distance $L_d$ between the pair of ring parts 14 and 14 is larger than the axial length $L_k$ of the roller 11 so that the roller can be rotatably held by the retainer 12, and a gap is generated between the end of the roller 11 and the ring part 14. Therefore, the roller 11 can move freely between the pair of ring parts 14 and 14. When the roller 11 temporarily makes its closest approach to one of the ring parts 14, a gap width between the roller 11 and the other of the ring parts 14 becomes a maximum width $L_1$ ($L_1 = L_d - L_k$) as shown in FIG. 6. Even in this temporal situation, a tip end 16r of the other projection member is in contact with the other chamfered part 13 and holds the roller 11 between the pair of ring parts. In this case, when there is a large difference between the distance $L_d$ between the ring parts, and the roller axial length $L_k$, and an axial length $L_2$ of the chamfered part 13 is small, a tip end 16l of the one projection member temporality reaches the roller rolling surface 11t beyond the chamfered part 13.

The part stating that the tip ends of the pair of projection members abut on the chamfered parts provided at both ends of the roller and hold the roller between the pair of ring parts, in the claim of the present invention is included in the above-described standard state. It is to be understood that the working example in which the tip end of the one of the projection members temporarily abuts on the roller rolling surface when the roller is moved to one axial direction is included in the claim of the present invention as long as the tip ends of the pair of projection members abut on the chamfered parts provided at both ends of the roller and hold the roller between the pair of ring parts in the standard state.

Root parts of the projection members 16 arranged circumferentially are connected by an arc-shaped connection member 17. The connection member 17 extends circumferentially around the axis O and its thickness in the radial direction is larger than its thickness in the axis O direction, so that it shows high rigidity against radial external force, and constitutes a partial or whole circumference of the ring composed of a flat thin plate material. The connection member 17 and the projection member 16 are integrally connected, while they are formed separately from the ring part 14.

A notch part 18 recessed in the axis O direction is formed in the inner wall of the ring part 14 opposed to the end face of the roller 11. The notch part 18 continuously extends in the circumferential direction along the inner circumferential edge of the ring part 14. Since an inner wall 19b of the notch part 18 is recessed from the inner wall 19a on the outer diameter side, a thickness of the inner circumferential edge of the ring part 14 in the axis O direction is smaller than a thickness of the outer circumferential edge thereof in the axis O direction. Thus, the connection member 17 is fitted in the notch part 18 and fixed in the inner wall 19b. Here, it is preferable that a depth of the notch part 18 in the axis O direction is roughly the same as a thickness of the connection member 17 in the axis O direction.

The connection member 17 in this working example is in the form of an endless ring and extending along the whole circumference of the ring part 14 as shown in FIG. 1. Thus, the plurality of projection members 16, 16, . . . can be mounted in the ring part 14 at the same time.

Figure 3:
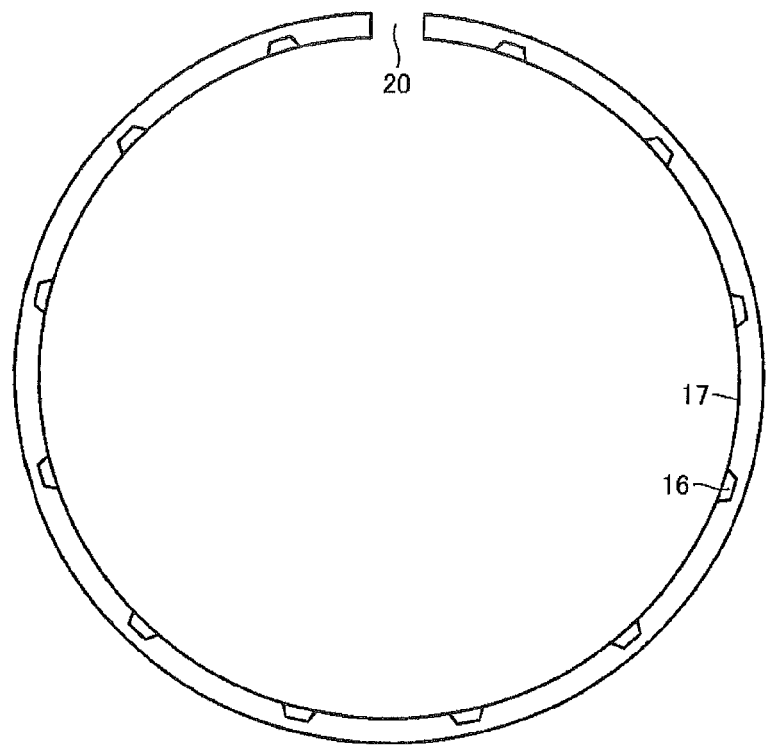
FIG. 3 is a front view showing a variation of the connection member.

Alternatively, the connection member 17 may be in the form of a C in which one circumferential end is opposed to the other end with a gap 20 open in the circumferential direction as shown in FIG. 3. For example, the gap 20 is a radially extending slit. A gap width of the gap 20 is smaller than the distance between the adjacent projection members 16 and 16. In the case of the form shown in FIG. 3, the connection member 17 can be mounted from the radial inner side of the ring part 14 in such a manner that its diameter is reduced in a step of producing the retainer-equipped roller, so that the retainer-equipped roller can be easily assembled. In this case, the projection member 16 and the connection member 17 are preferably made of a resin. Thus, the projection member 16 can be easily produced by injection molding.

Figure 4:
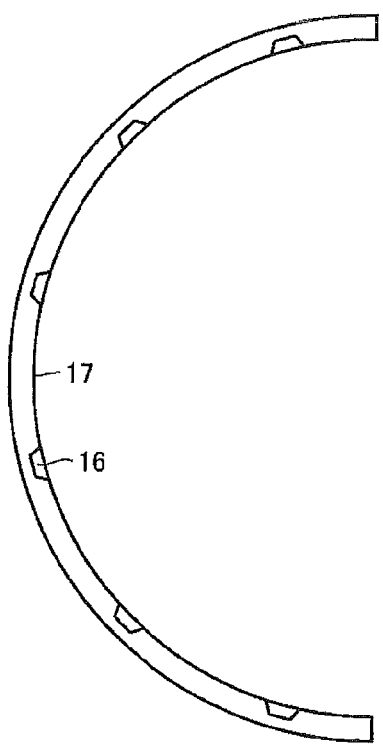
FIG. 4 is a front view showing a variation of the connection member.

Alternatively, the connection member 17 may be made such that two 180-degree arc-shaped segments each shown in FIG. 4, are formed into a 360-degree ring body. Thus, the two arc-shaped segments of the connection member are combined and formed into an endless ring and mounted along the whole circumference of the ring part 14. While the projection member 16 and the connection member 17 may be made of a resin by machining or injection molding, the projection member 16 and the connection member 17 are preferably made of metal in the case in FIG. 4. Thus, the projection member 16 can be improved in strength.

The projection members 16 are mounted in the ring part 14, and then the rollers 11 are fitted in from the radial inner side, whereby the retainer-equipped roller is completed. In addition, since the ring part 14 and the projection member 16 are elastically deformed, they can be fitted in.

Figure 5:
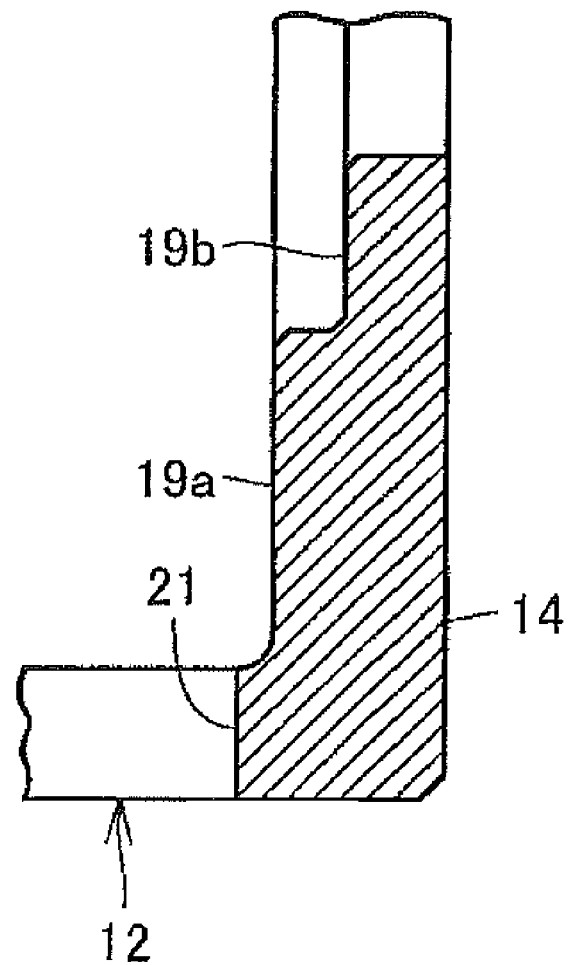
FIG. 5 is an enlarged view of a cross section of a ring part.

FIG. 5 is an enlarged view of the cross section of the ring part 14. In the case where the retainer 12 is made of metal, the ring part 14 has a protrusion 21 protruding toward the end face of the roller 11 so as to stride across the circumferentially adjacent column parts 15 and 15. As shown in FIG. 5, the protrusion 21 protrudes from the inner wall 19a toward the inner side in the axis O direction. Thus, one pocket 22 is formed by the adjacent column parts 15 and 15 and the protrusions 21 provided in the pair of ring parts 22. The pocket 22 holds the roller 11 so as to prevent the roller 11 falls off the retainer 12 in the outer diameter direction. In addition, since the protrusion 21 is always interposed between the inner wall 19a of the ring part 14 and the end face of the roller 11, the roller 11 can be prevented from abutting on the inner wall 19a of the ring part 14 and the connection member 17.

As shown in FIG. 6, under the condition that the connection member 17 is mounted in the ring part 14, an inner wall 17a of the connection member 17 opposed to the end face of the roller 11 is recessed in the axial direction by a distance $L_3$ from the protrusion 21 serving as a wall surface of the pocket opposed to the end face of the roller 11. Thus, the roller 11 can be prevented from abutting on the inner wall 17a. In addition, in the case where the retainer 12 is made of the resin, the protrusion 21 is not provided and the inner wall 19a of the ring part 14 forms the wall surface of the pocket 22. In this case, the inner wall 17a of the connection member 17 is to be recessed from the inner wall 19a of the ring part 14.

According to this working example, the pair of ring parts 14 has the pair of projection members 16l and 16r projecting such that the tip ends come close to each other, in circumferentially the same position as the column part 15 and in the position on the radial inner side of the pitch circle PCD of the roller 11, so that the many rollers 11 can be circumferentially arranged in the retainer 12 while the roller 11 can be prevented from dropping off in the inner diameter direction and the outer diameter direction of the retainer 12. Therefore, the retainer-equipped roller in this working example can be high in load capacity.

In addition, since the pair of projection members 16 project to the chamfered part 13 of the roller 11, the projection member 16 does not reach the rolling surface 11t of the roller 11, so that the lubricant oil can be smoothly supplied from the radial inner side to the space between the circumferentially adjacent rollers 11 and 11.

In addition, since a diameter of the chamfered part 13 is smaller than a diameter of the roller rolling surface 11t, according to this working example in which the projection member 16 abuts on the chamfered part 13, a circumferential thickness of the projection member 16 can be larger than a circumferential thickness of the inside support in the patent document 1 which abuts on the rolling surface 11t. In addition, the thickness (a radial thickness and the circumferential thickness, especially the circumferential thickness) of the projection member 16 may be large in the root side and small in the tip end side although it is not shown in the drawing. When the projection member 16 is tapered as described above, both tip end side and root side of the projection member 16 can appropriately abut on the chamfered part provided at each end of the roller. Therefore, the roller 11 can be appropriately prevented from dropping off in the inner diameter direction of the retainer 12.

In addition, according to this working example, since the projection member 16 is mounted on the radial outer side of the inner circumferential edge of the ring part 14, the radial thickness of the retainer 12 can be small.

While the embodiments of the present invention have been described with reference to the drawings in the above, the present invention is not limited to the above-illustrated embodiments. Various kinds of modifications and variations may be added to the illustrated embodiments within the same or equal scope of the present invention.

Industrial Applicability

The retainer-equipped roller according to the present invention can be advantageously applied in a rolling bearing.

Explanation of References

11 ROLLER, 11T ROLLER ROLLING SURFACE, 12 RETAINER, 13 CHAMFERED PART, 14 RING PART, 15 COLUMN PART, 16 PROJECTION MEMBER, 17 CONNECTION MEMBER, 17A CONNECTION MEMBER INNER WALL, 18 NOTCH PART, 19A RING PART INNER WALL, 19B NOTCH PART INNER WALL, 20 GAP, 21 PROTRUSION, 22 POCKET

The invention claimed is:

1. A retainer-equipped roller comprising a retainer having a pair of ring parts separated in an axial direction and column parts arranged circumferentially at regular intervals so as to form pockets and connect said pair of ring parts, and a plurality of rollers arranged in said pockets, wherein
said roller has a chamfered part between a roller end face and a roller rolling surface,
said column part is positioned on a radial outer side of a pitch circle of said roller, and a distance between the circumferentially adjacent column parts is smaller than a diameter of said roller,
said pair of ring parts has a pair of projection members projecting such that their tip ends are opposed so as to come close to each other, in circumferentially the same position as said column part, and in a position on a radially inner side of the pitch circle of said roller, and
said tip ends of the pair of projection members abut on said chamfered parts provided at both ends of the roller and hold the roller between the pair of ring parts, and
in a state where said roller temporarily makes its closest approach to one of said ring parts and a gap width between said roller and the other of said ring parts becomes temporarily a maximum width, the tip end of said one projection member temporarily reaches the roller rolling surface behind said chamfered part and the tip end of said other projection member is in contact with the other chamfered part, with said pair of projection members stil holding said roller between said pair of ring parts.

2. The retainer-equipped roller according to claim 1, wherein
said projection member is mounted on a radially outer side of an inner circumferential edge of said ring part.

3. The retainer-equipped roller according to claim 1, wherein
at least two circumferentially adjacent projection members are connected by a circumferentially extending connection member.

4. The retainer-equipped roller according to claim 3, wherein
said connection member is in the form of an endless ring and extends along a whole circumference of said ring part.

5. The retainer-equipped roller according to claim 4, wherein
said projection member and said connection member are made of a resin.

6. The retainer-equipped roller according to claim 3, wherein
said connection member is in the form of a C and one end and the other end thereof in a circumferential direction are opposed with a gap open in the circumferential direction.

7. The retainer-equipped roller according to claim 3, wherein
said connection member is composed of a plurality of arc-shaped segments, and said plurality of arc-shaped segments are mounted along a whole circumference of said ring part, and form an endless ring.

8. The retainer-equipped roller according to claim 7, wherein
said projection member and said connection member are made of metal.

9. The retainer-equipped roller according to claim 3, wherein
an inner wall of said connection member mounted in said ring part and opposed to the end face of said roller is axially recessed from a wall surface of said pocket opposed to said roller end face.

10. The retainer-equipped roller according to claim 1, wherein
said projection member is tapered such that its thickness is large on its root side and small on its tip end side.

11. A retainer-equipped roller comprising a retainer having a pair of ring parts separated in an axial direction and column parts arranged circumferentially at regular intervals so as to form pockets and connect said pair of ring parts, and a plurality of rollers arranged in said pockets, wherein
said roller has a chamfered part between a roller end face and a roller rolling surface,
said column part is positioned on a radial outer side of a pitch circle of said roller, and a distance between the circumferentially adjacent column parts is smaller than a diameter of said roller,
said pair of ring parts has a pair of projection members projecting such that their tip ends are opposed so as to come close to each other, in circumferentially the same position as said column part, and in a position on a radially inner side of the pitch circle of said roller, and
said tip ends of the pair of projection members abut on said chamfered parts provided at both ends of the roller and hold the roller between the pair of ring parts, wherein at least two circumferentially adjacent projection members are connected by a circumferentially extending connection member, and further wherein
a notch part recessed in the axial direction is formed in an inner wall of said ring part opposed to said roller end face, and
said connection member is fitted in said notch part.

* * * * *